(12) United States Patent
Kollu

(10) Patent No.: US 9,749,236 B2
(45) Date of Patent: Aug. 29, 2017

(54) INCREASED NETWORK SCALABILITY BY ROUTER AWARE SWITCHES

(71) Applicant: Brocade Communications Systems, Inc., San Jose, CA (US)

(72) Inventor: Badrinath Kollu, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 155 days.

(21) Appl. No.: 14/446,170

(22) Filed: Jul. 29, 2014

(65) Prior Publication Data
US 2016/0036699 A1 Feb. 4, 2016

(51) Int. Cl.
*H04L 12/28* (2006.01)
*H04L 12/741* (2013.01)

(52) U.S. Cl.
CPC .................................. *H04L 45/74* (2013.01)

(58) Field of Classification Search
CPC ...................................................... H04L 45/74
See application file for complete search history.

(56) References Cited

U.S. PATENT DOCUMENTS

| | | | |
|---|---|---|---|
| 7,466,712 B2 | 12/2008 | Makishima | |
| 7,742,484 B2 | 6/2010 | Makishima | |
| 7,844,056 B1 * | 11/2010 | DeSanti | H04L 12/4633 380/258 |
| 7,936,769 B2 | 5/2011 | Chung | |
| 8,059,664 B2 | 11/2011 | Wilson | |
| 8,081,642 B2 | 12/2011 | Del Signore | |
| 8,125,992 B2 | 2/2012 | Makishima | |
| 8,446,913 B2 | 5/2013 | Chung | |
| 8,532,119 B2 | 9/2013 | Snively | |
| 9,172,556 B2 | 10/2015 | Del Signore | |
| 2003/0189930 A1 * | 10/2003 | Terrell | H04L 45/00 370/389 |
| 2003/0202510 A1 * | 10/2003 | Witkowski | H04L 49/25 370/386 |
| 2003/0202520 A1 * | 10/2003 | Witkowski | H04L 12/5601 370/400 |

(Continued)

OTHER PUBLICATIONS

T11, Fibre Channel Inter-Fabric Routing (FC-IFR), May 12, 2010, cover-p. 51.

(Continued)

*Primary Examiner* — Gregory Sefcheck
*Assistant Examiner* — Jael Ulysse
(74) *Attorney, Agent, or Firm* — Blank Rome, LLP

(57) ABSTRACT

Handling of ELS REQ and RSP packets that contain addresses in the payload is shifted to the edge fabric switches connected to the node devices issuing and receiving the ELS REQ packet, the ingress and egress switches. This allows the ELS REQ and RSP packet payload address modification operations to be removed from the tasks handled by the router processor. As this removes a processing burden from the router processors, those router processors are free to handle other normal operations, thus allowing more processor bandwidth to be provided to those other operations, which allows further growth of the network as one limitation has been removed. The need to replicate or provide commands between switches or routers is avoided as there are no redundant paths at that point.

14 Claims, 6 Drawing Sheets

(56) References Cited

U.S. PATENT DOCUMENTS

| | | | | |
|---|---|---|---|---|
| 2004/0030766 | A1* | 2/2004 | Witkowski | H04L 41/082 709/223 |
| 2005/0094568 | A1* | 5/2005 | Judd | H04L 12/56 370/242 |
| 2005/0243725 | A1* | 11/2005 | Wrenn | H04L 69/40 370/238 |
| 2006/0023707 | A1* | 2/2006 | Makishima | H04L 45/60 370/389 |
| 2006/0023708 | A1* | 2/2006 | Snively | H04L 45/00 370/389 |
| 2006/0023751 | A1* | 2/2006 | Wilson | H04L 45/00 370/474 |
| 2006/0034302 | A1* | 2/2006 | Peterson | H04L 45/04 370/401 |
| 2006/0171330 | A1* | 8/2006 | Mandrell | H04L 49/357 370/254 |
| 2007/0147267 | A1* | 6/2007 | Holland | H04L 67/1097 370/252 |
| 2009/0006716 | A1* | 1/2009 | Lubbers | G06F 3/062 711/100 |
| 2009/0006732 | A1* | 1/2009 | Lubbers | G06F 3/0605 711/110 |
| 2009/0080428 | A1* | 3/2009 | Witkowski | H04L 49/352 370/392 |
| 2010/0274876 | A1* | 10/2010 | Kagan | G06F 12/1072 709/221 |
| 2011/0262134 | A1* | 10/2011 | Armstrong | H04L 49/357 398/45 |
| 2014/0055776 | A1* | 2/2014 | Hathorn | H04L 43/0805 356/73.1 |
| 2014/0101347 | A1* | 4/2014 | Chandhoke | G06F 13/404 710/26 |
| 2014/0307741 | A1* | 10/2014 | Hathorn | H04L 45/42 370/400 |
| 2016/0006674 | A1 | 1/2016 | Del Signore | |

OTHER PUBLICATIONS

T11, Fibre Channel Link Services (FC-LS-2), Jun. 26, 2008, cover-p. 192.

* cited by examiner

INCREASED NETWORK SCALABILITY BY ROUTER AWARE SWITCHES

BACKGROUND OF THE INVENTION

1. Field of the Invention

The present invention relates generally to storage area networks.

2. Description of the Related Art

Fibre Channel has been a preferred protocol for data center storage for many years and continues to be so. This is true despite some architectural problems with Fibre Channel. One architectural problem is a limited number of domains, commonly equated to switches. For one fabric Fibre Channel has a theoretical maximum of 239 domains, each capable of theoretically 256 areas, each with a theoretical limit of 255 devices. However, other aspects of the protocol put a much lower practical limit on the size of a fabric. One such aspect relates to operations that must occur when a switch is added to or removed from the fabric. The operations are so time and processor intensive that usually a fabric has many fewer domains for stability purposes.

This smaller practical domain limit and a practice of dedicating a domain to a switch results in a maximum fabric size much less than currently desired in modern large data centers. One solution to this problem has been the use of Fibre Channel routers. Basically routers connect two different fabrics but prevent the two fabrics from merging, as would occur under normal Fibre Channel procedures. Using routers each fabric can be kept at a reasonable size and yet the total number of devices on the overall network can reach much higher levels.

While routers have allowed a large increase in overall network size, because of other Fibre Channel fundamental characteristics, even a router topology becomes a limiting factor in network size. Certain Fibre Channel packets, specifically certain extended link service (ELS) requests (REQs) and responses (RSPs) contain device addresses in the payload of the packet as well as the header. One characteristic of routers is that the routers translate device addresses at each router location. This is because each node device on a fabric can only use fabric local addresses but this would result in many address conflicts if the packet is just provided unchanged to another fabric. So the router performs address translations for each packet. For headers this translation can be setup to be performed almost entirely in switch ASIC hardware but payload address translation cannot be automated in a similar manner. Thus each packet that carries addresses in the payload must be handled by a router processor using firmware. Thus, for a router, each ELS REQ and RSP packet that contains an address in the header must be trapped and handled by the router processor. This slows down operations and may lead to a performance limitation, which then turns into a network size limitation.

One characteristic of Fibre Channel that has led to its continued success is the reliability of the protocol. This underlying reliability is often increased by providing multiple paths for all routes. When this multipath approach is applied to routers between fabrics, it complicates the handling of the ELS REQ and RSP packets. Because an ELS RSP packet may travel a different route back to the source than was traveled by the ELS REQ packet, each router in the multiple paths must be aware of any needed translations. Therefore when a given router receives an ELS REQ packet that will have an ELS RSP packet that contains an address, information of that ELS REQ packet must be provided to all routers that might handle the ELS RSP packet, that is, all multipath routers. This requires additional packets be communicated between the routers themselves to maintain state. Then when the ELS RSP packet is received and has been modified as needed, the receiving router must inform all of the other routers that the ELS RSP packet has been processed so that the sequence can be removed from state memory. So yet another inter-router communication must occur. These inter-router communications are all handled by the router processors, so they further exacerbate performance issues of the processors, as well as slow down operations due to wait times for router responses before the actual packets can be forwarded.

Therefore, while routers have allowed much larger networks to be developed practically, the networks are again at the limits of growth, in part due to limitations of router processors.

SUMMARY OF THE INVENTION

In networks according to the present invention handling of ELS REQ and RSP packets that contain addresses in the payload is shifted to the edge fabric switches connected to the node devices issuing and receiving the ELS REQ packet, the ingress and egress switches. This allows the above described ELS REQ and RSP packet payload operations to be removed from the tasks handled by the router processor. As this removes a processing burden from the router processors, those router processors are free to handle other normal operations, thus allowing more processor bandwidth to be provided to those other operations, which allows further growth of the network as one limitation has been removed. By moving the operations to the ingress and egress switches, the need to replicate or provide commands between switches or routers is avoided as there are no redundant paths at that point. Further, by having the operations done at the ingress and egress switches there is also no consolidating factor of multiple flows from multiple node devices, just the flows from the directly attached node devices. This minimizes the impact on the ingress and egress switches as well.

BRIEF DESCRIPTION OF THE DRAWINGS

The present invention has other advantages and features which will be more readily apparent from the following detailed description of the invention and the appended claims, when taken in conjunction with the accompanying drawings, in which:

DETAILED DESCRIPTION

Figure 1:
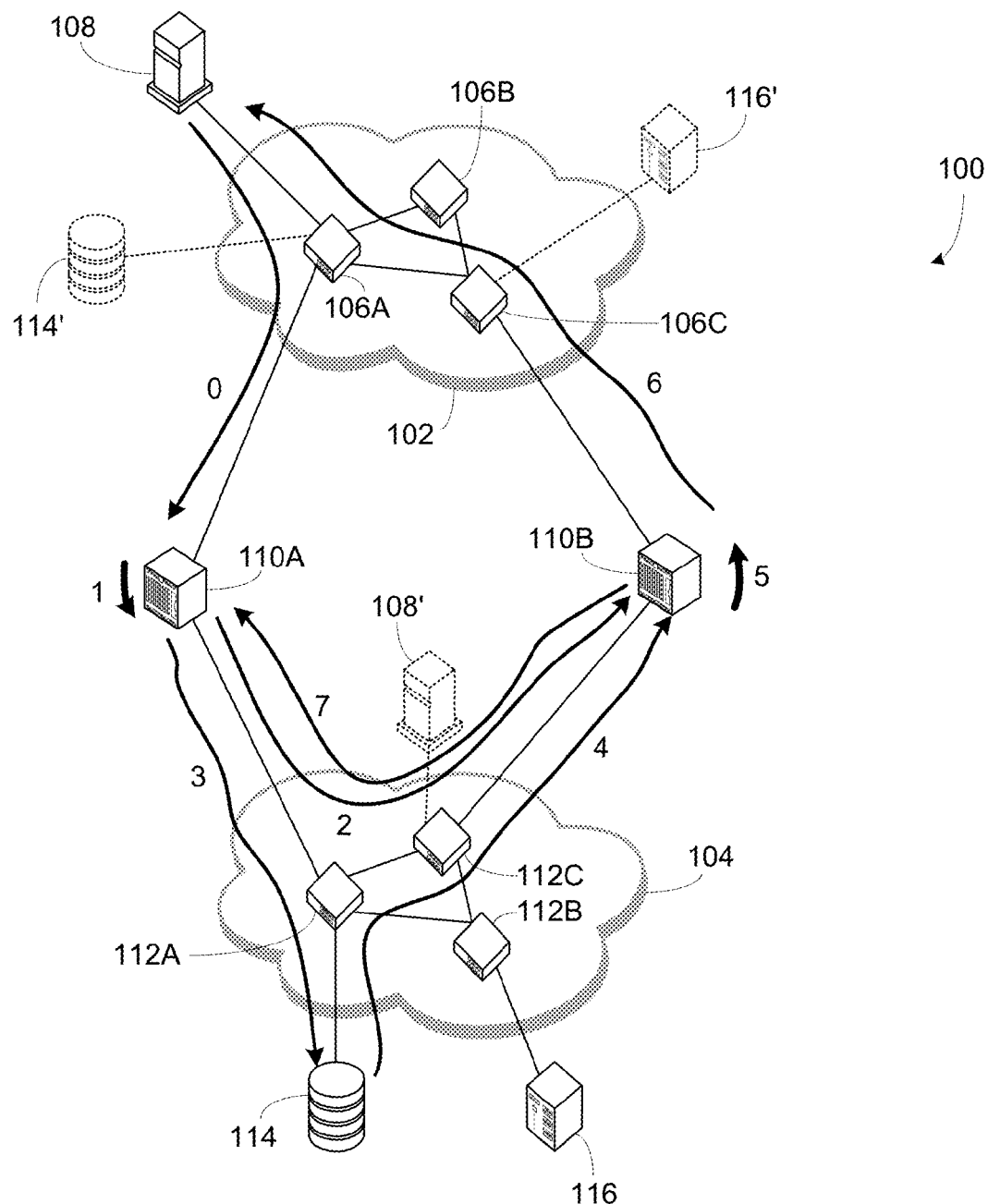
FIG. 1 illustrates an exemplary network according to the prior art.

Referring now to FIG. 1, a network 100 illustrating flows according to the prior art is shown. Network 100 includes a first fabric 102 and a second fabric 104. The second first fabric 102 is formed by three switches 106A, 106B and 106C. A host or server node device 108 is connected to switch 106A. Fabric 104 is formed by three switches 112A, 112B and 112C. A disk storage unit 114 is connected to switch 112A while a tape storage unit 116 is connected to switch 112B. Switch 106A is also connected to a first router 110A. Router 110A is also connected to switch 112A. Switch 112C is connected to a second router 110B which is also connected to switch 106C.

By the operation of the routers 110A and 110B phantom devices appear in fabrics 102 and 104. Disk storage unit 114' appears to be connected to phantom domain created by the router 110A, the phantom domain appearing as part of the first fabric 102. To simplify FIG. 2, the disk storage unit 1114' is shown connected to switch 106A, as any access from the first fabric 102 must go through switch 106A to access the disk storage unit 114'. A phantom tape storage unit 116' appears to be connected to a phantom domain created by router 110B, the phantom domain appearing as a part of the second fabric 104, while a phantom host 108' appears to be connected to a different phantom domain created by router 110B, the phantom domain appearing as a part of the second fabric 104. Again for simplicity the tape storage unit 116' is shown connected to switch 106C and host 108' is shown connected to switch 112C.

FIG. 1 illustrates the flow of an ELS REQ packet from host 108 to disk tape storage unit 114. The ELS request packet is transmitted from host 108 and passes through switch 106A enroute to router 110A. Router 110A traps the ELS REQ packet as modifications are necessary. After completing the modifications to the frame, the router 110A sends a command to router 110B so that router 110B can place the ELS REQ packet in a context to allow trapping of the ELS RSP packet if it passes through router 110B. After the acknowledgement for the command is received from router 110B, router 110A transmits the modified ELS REQ packet which is received at switch 112A and forwarded to disk storage unit 114.

Disk storage unit 114 performs the desired operation and provides an ELS RSP packet which travels through switch 112A and switch 112C to router 110B. As router 110B has formed a trap for this ELS RSP packet, the ELS RSP packet is provided to the router 110B processor where the payload is modified. The modified packet is then provided out of the router 110B to switch 106C which provides the ELS RSP packet to switch 106A which provides it to host 108, thus completing the ELS operation. The router 110B sends a command to router 110A to delete the context for the ELS REQ/RSP operation as the ELS RSP packet has been received and modified.

As can be seen there are many operations required by the routers 110A and 110B which use router processor resources and delay processing of the ELS packets. For example, communication between the two routers 110A and 110B must occur at least to set up the context in router 110B. The CPU-based processing is also done in the routers 110A and 110B and therefore as the number of ELS REQ and ELS RSP packets increases, the workload on the router 110A, 110B processors increases as described in the background. Ultimately this workload of the processors begins to limit the size of a network that can be handled by the routers 110A and 110B, thus artificially limiting the size of the network 100.

It is understood that a simple network with only two fabrics, two routers and a few devices is illustrated in the Figures to simplify explanation of the prior art and operations according to the present invention. It is understood that in a conventional or actual embodiment there would be numerous hosts switches and storage units involved, enough so that throughput of the routers 110A and 110B would be a limiting factor in the size of the network.

Figure 2:
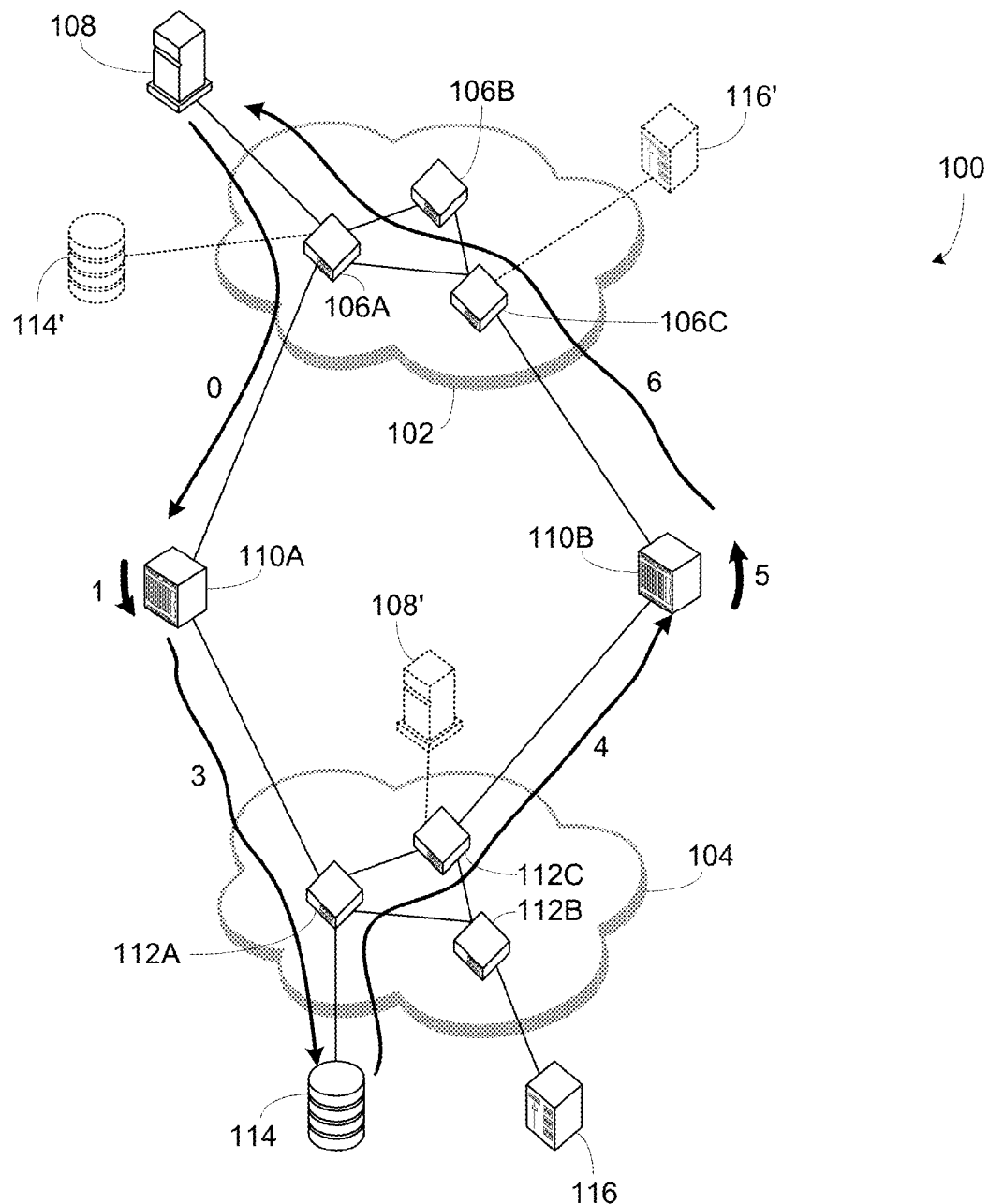
FIG. 2 illustrates an exemplary network according to the prior art.

FIG. 2 illustrates the simpler flow where the ELS REQ and ELS RSP packets do not contain a device address in the payload. The ELS REQ packet is issued from host 108 travels through switch 106A and arrives at router 110A. As no changes are necessary the router 110A simply forwards the packet to switch 112A and then to disk storage unit 114. The ELS RSP packet is provided from the disk storage unit 114 through the switch 112A to the switch 112C and then to the router 110B. As no context is set up in router 110B, all ELS RSP packets must be trapped for handling by the processor of the router 110B. As no changes are necessary in this scenario, the ELS RSP packet simply transfers through router 110B to switch 106C and then switch 106A and finally to host 108. By contrasting the flow of FIG. 2 with the flow of FIG. 1 the additional workload on the routers 110A and 110B can be understood.

Figure 3:
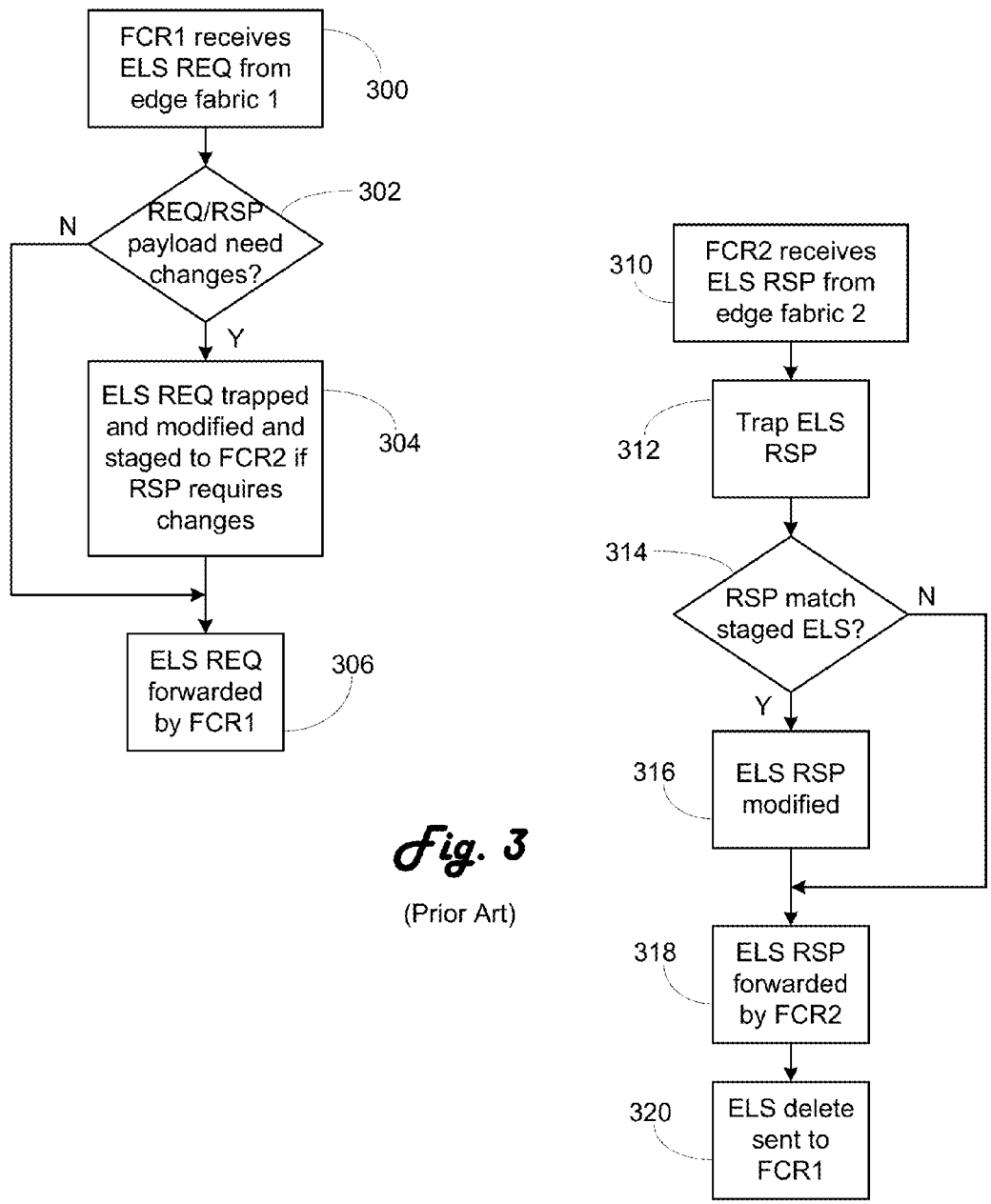
FIG. 3 is a flow chart of the operations of the networks of FIGS. 1 and 2.

The operations of FIGS. 1 and 2 are provided in the flowchart of FIG. 3. In step 300 the router 110A receives the ELS REQ packet provided from the host 108. In step 302 the router 110A determines if the ELS REQ packet or ELS RSP packet payload will be changed due to the presence of device addresses. This is done by trapping for particular ELS operation codes in the payload of the packet by trap logic contained in the router 110A. If changes are necessary, the ELS REQ packet is trapped and modified by the router 110A processor in step 304 and the relevant information is staged to router 110B if the ELS RSP packet also requires changes. After the modification or if no changes are required in step 306, the ELS REQ packet is forwarded by the router 110A to the disk storage unit 114.

For the ELS RSP packet, in step 310 the router 110B receives the ELS RSP packet from switch 112C. In step 312 the router 110B traps the ELS RSP packet as it has been indicated based on the modification staging and context provided by the router 110A in step 304. If in step 314 the ELS RSP packet is a match, then in step 316 the ELS RSP packet payload is modified as necessary. After step 316 or if there was no match in step 314, the ELS RSP packet is forwarded by router 110B to the host 108 in step 318. In step 320 the router 110B provides the ELS delete message to router 110A.

Figure 4:
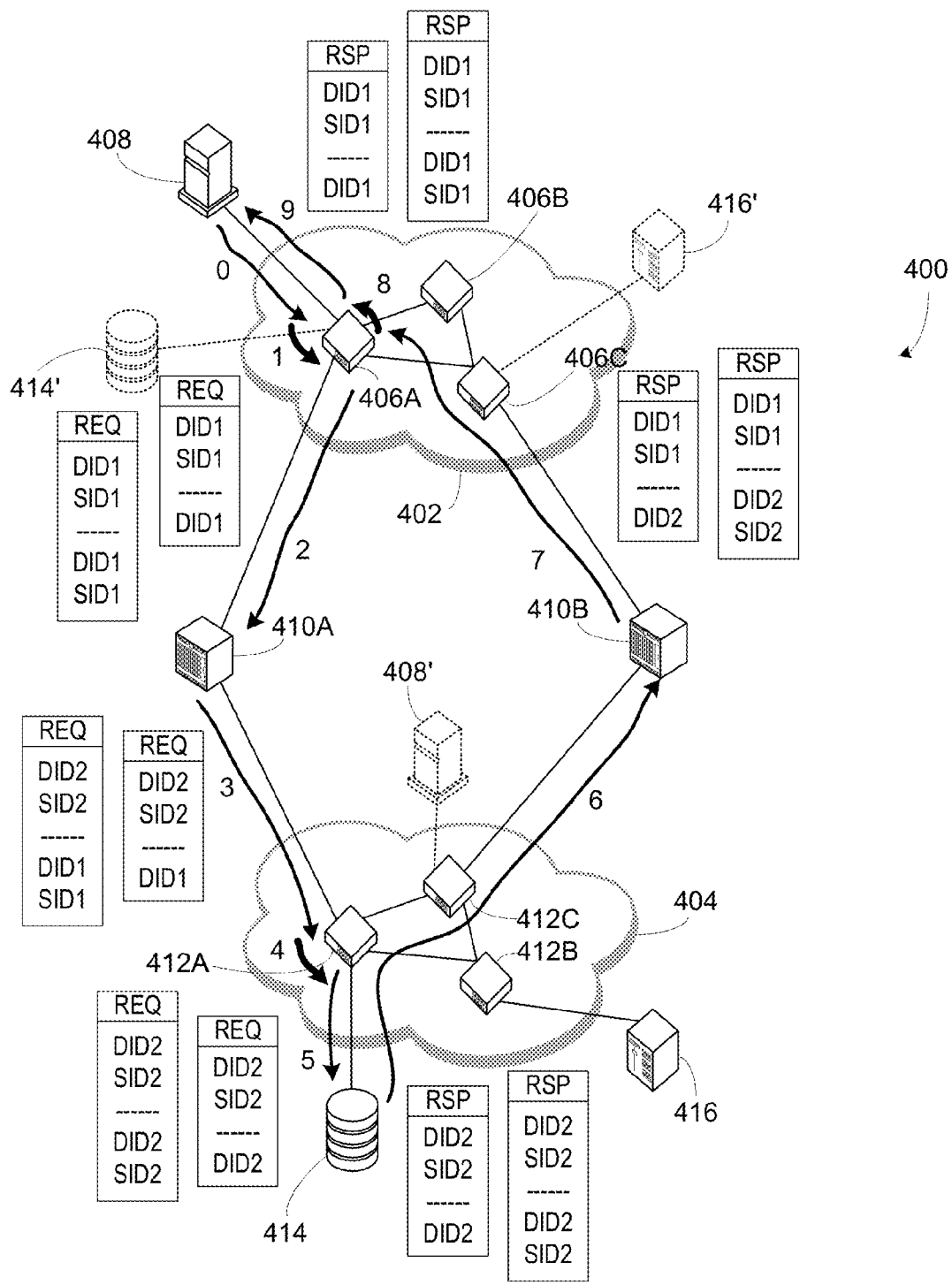
FIG. 4 illustrates an exemplary network according to the present invention.
Figure 5:
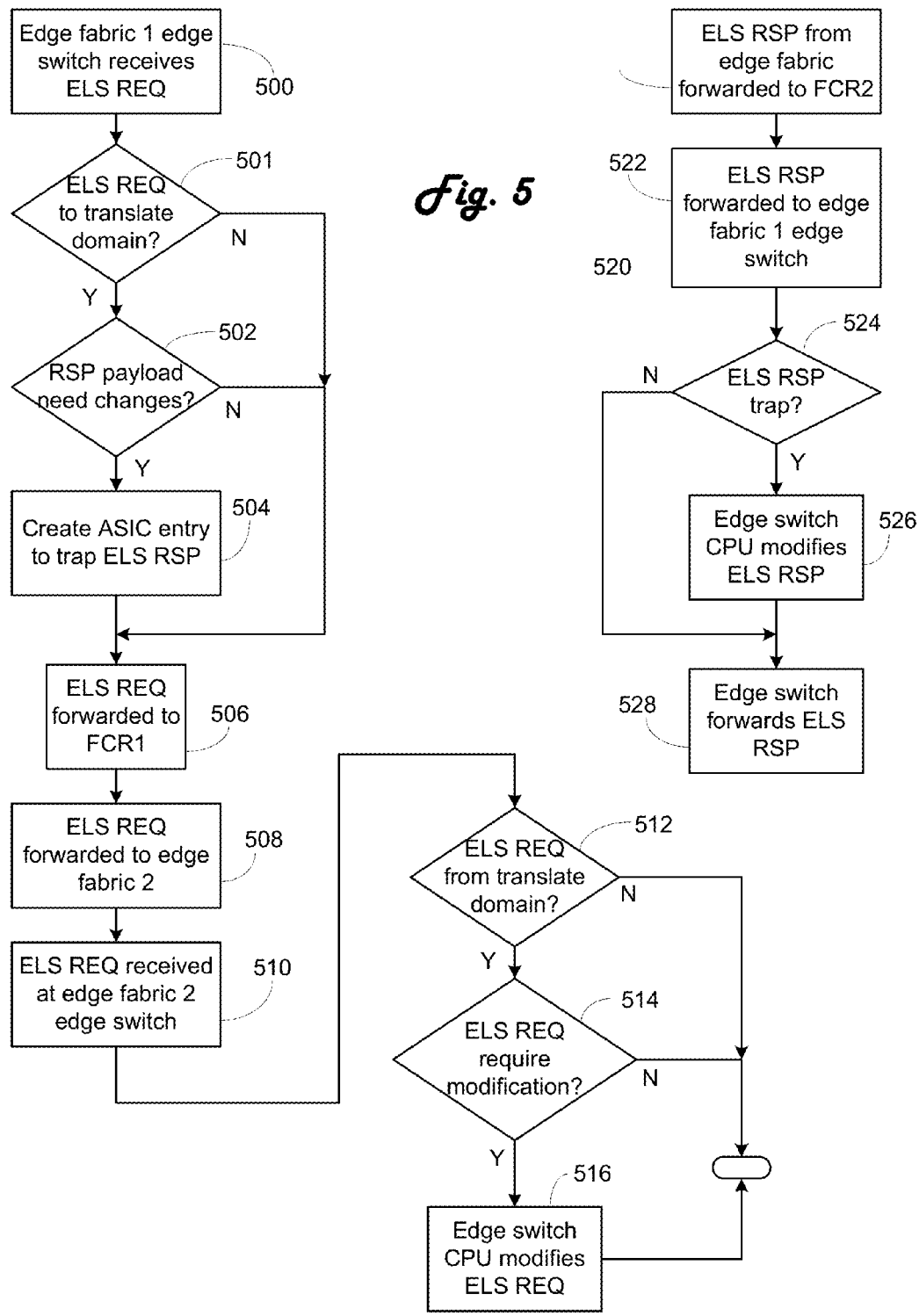
FIG. 5 is a flow chart of the operations of the network of FIG. 4.

Operation of a preferred embodiment according to the present invention is illustrated in FIGS. 4 and 5. FIG. 4 is the same network topology and components as shown in FIG. 1 except the initial numerals are changed from a one to a four. Thus it is network 400, fabric 402, fabric 404 and so on. Further illustrated in FIG. 4 are relevant portions of the header and payload of the ELS REQ and ELS RSP packets of interest. The host 408 provides an ELS REQ packet to ingress switch 406A. Switch 406A analyzes the ELS REQ packet to determine if changes are necessary to addresses in the payload of the ELS RSP packet. If so, a trap is set to handle the ELS RSP packet but no payload modifications are performed in switch 406A on the ELS REQ packet. The ELS REQ packet is forwarded to the router 410A where the router hardware automatically changes the header addresses from addresses of fabric 402, indicated by DID1 and SID1, to addresses of fabric 404, indicated by the DID2 and SID2. Therefore the packet that is transmitted from router 410A has a header addressed DID2 and SID2 but the payload still contains the DID1 information as the packet is not trapped for handling by the router 410A. Upon receipt by the switch 412A, the egress switch in the illustrated embodiment, the switch 412A analyzes the packet and determines it is an ELS REQ packet with an address in the payload and therefore traps and modifies the address in the payload as indicated by the address changing to DID2. The modified packet is then forwarded to the targeted disk storage unit 414.

Completing operation, the disk storage unit 414 provides an ELS RSP packet to switch 412A which simply passes the ELS RSP packet through even though an address is present in the payload that must be changed. Switch 412B passes the ELS RSP packet to router 410B, which performs the header address translation as illustrated and provides the header translated packet to switch 406C. Switch 406C provides the packet to switch 406A, the egress switch, which concludes that this is the ELS RSP packet to the previous ELS REQ packet and therefore traps the ELS RSP packet to the switch processor for modification. The switch 406A processor modifies the ELS RSP packet payload to indicate the proper destination address, in the example DID1. This is done by having the switch processor review the header destination address and copy the header destination address into the payload address location. The packet is then forwarded to the host 408.

As seen, there are no operations in the routers 410A or 410B that are performed by the router processors, only the conventional header translations which are performed by the router hardware in the preferred embodiment. This removes the processing required for the ELS REQ and ELS RSP packets by the router processors. This reduced workload for these two packet types allows the router processor bandwidth to be provided to and used by other router operations, which effectively allows the router to scale to a larger network level. As the operations of modifying the packet are performed as necessary by the ingress and egress switches, the actual modification workload is minimized and not concentrated in any particular device but only handled by the switches that are actually connected to devices that are issuing or receiving the respective ELS REQ and ELS RSP packets.

Also shown in FIG. 4 for illustration are the address changes which are performed on ELS REQ and ELS RSP packets that contain two addresses in the payload. Effectively the relevant switches simply change both addresses in the payload. Reviewing the packet received by switch 412A, it is noted that the packet contains the proper addresses in the header, DID2 and SID2 in the illustration, and the improper addresses, DID1 and SID1, in the payload. By referencing the proper two addresses from the header, the switch 412A simply places those values into the payload and then provides the packet to the disk storage unit 414.

Operation according of FIG. 4 and according to the present invention is illustrated in FIG. 5. In step 500 the ingress switch 406A in fabric 402 receives an ELS REQ packet from the host 408. In step 501 the switch 406A determines that the packet is destined to the translate domain of the router 410A. According to Fibre Channel standards, a router provides two levels of virtual domains at a connected port. The first level is a front domain and the second level is a translate domain. More on this operation and architecture can be illustrated by reviewing the FC-IFR Rev. 1.06 specification, especially Section 4.4. By determining that the destination address is the translate domain, this indicates that the packet is being addressed to a phantom device, such as phantom disk storage unit 414', and therefore modifications may need to be performed. In step 502 the switch 406 determines if the ELS RSP payload will need to be changed or modified. If so, in step 504 an entry into the switch ASIC contained inside the switch 406 is made to trap the ELS RSP packet on its return. If not to the translate domain in step 501 or if no changes are needed in step 502 or after step 504, the ELS REQ packet is forwarded to the router 410A in step 506. In step 508 the router 410A forwards the ELS REQ packet to switch 412A in fabric 404. As switch 412A is the egress switch for this particular packet as switch 412A is connected to disk storage unit 414, the ELS REQ packet is received at switch 412A in step 510 and trapped to the switch processor. In step 512 the switch 412A determines if the ELS REQ packet is from the translate domain provided by the router 410A for fabric 404. If so, in step 514 a determination is made whether the ELS REQ packet requires modification. If so, in step 516 the processor or CPU in switch 412A modifies the payload address in the ELS REQ packet as illustrated in FIG. 4. If the packet is not from the translate domain in step 512 or is not required to be modified in step 514 or the edge switch has completed modification in step 516, the request phase operations complete.

In step 520 the ELS RSP packet is forwarded by switches 412A and 412B to router 410B. It is noted that no operations are performed in ingress switch 412A regarding the ELS RSP packet. In step 522 the ELS RSP packet is forwarded by the router 410B to fabric 402, specifically switch 406C, which then provides the ELS RSP packet to the switch 406A, the egress switch for the ELS RSP packet. In step 524 the switch ASIC traps the ELS RSP packet based on the trap set in step 504. In step 526 the switch processor modifies the address or addresses in the packet payload to provide the right addresses. If the ELS RSP packet is not trapped in step 524 or after step 526 the switch 406A forwards the ELS RSP packet in step 528 to host 408 to complete the ELS operation.

Figure 6:
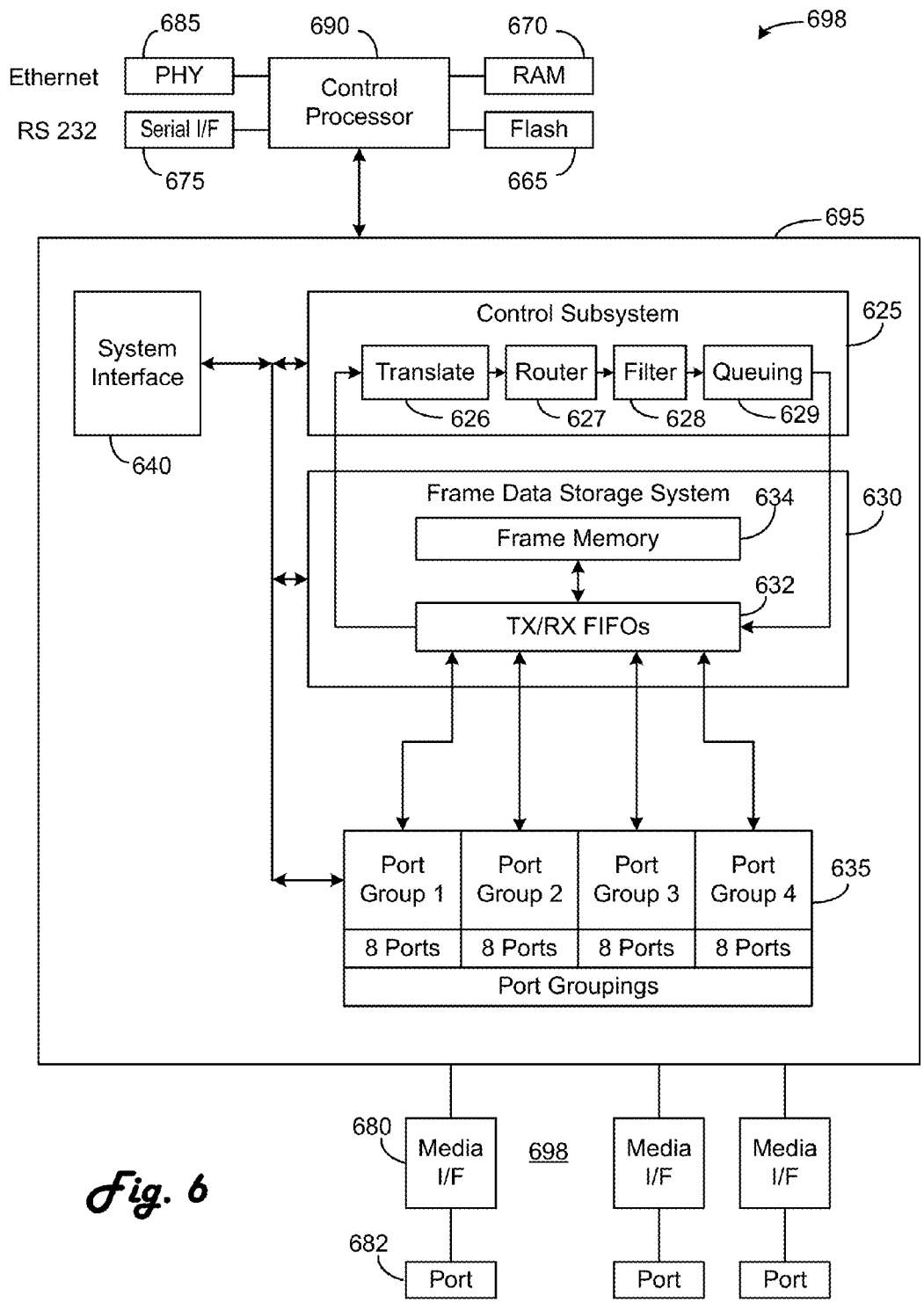
FIG. 6 is a block diagram of an exemplary switch or router according to the present invention.

FIG. 6 is a block diagram of an exemplary router or switch 698. A control processor 690 is connected to a router or switch ASIC 695. The ASIC 695 is connected to media interfaces 680 which are connected to ports 682. Generally the control processor 690 configures the ASIC 695 and handles higher level router or switch operations, such as the name server, routing table setup, and the like. The ASIC 695 handles general high speed inline or in-band operations, such as switching, routing and frame header translation. The control processor 690 is connected to flash memory 665 or the like to hold the software and programs for the higher level router or switch operations and initialization such as performed in FIGS. 3 and 5; to random access memory (RAM) 670 for working memory, such as the name server and router tables; and to an Ethernet PHY 685 and serial interface 675 for out-of-band management.

The ASIC 695 has four basic modules, port groups 635, a frame data storage system 630, a control subsystem 625 and a system interface 640. The port groups 635 perform the lowest level of packet transmission and reception. Generally, frames are received from a media interface 680 and provided to the frame data storage system 630. Further, frames are received from the frame data storage system 630 and provided to the media interface 680 for transmission out of port 682. The frame data storage system 630 includes a set of transmit/receive FIFOs 632, which interface with the port groups 635, and a frame memory 634, which stores the received frames and frames to be transmitted. The frame data storage system 630 provides initial portions of each frame, typically the frame header and a payload header for FCP frames, to the control subsystem 625. The control subsystem 625 has the translate 626, router 627, filter 628 and queuing 629 blocks. The translate block 626 examines the frame header and performs any necessary address translations, such as those that happen in a router where packet header addresses must be changed. There can be various embodiments of the translation block 626, with examples of translation operation provided in U.S. Pat. No. 7,752,361 and U.S. Pat. No. 7,120,728, both of which are incorporated herein by reference in their entirety. The router block 627 examines the frame header and selects the desired output port for the frame. The filter block 628 examines the frame header, and the payload header in some cases, to determine if the frame should be transmitted. The queuing block 629 schedules the frames for transmission based on various factors including quality of service, priority and the like.

Therefore by removing ELS REQ and ELS REP packet payload address translation duties from the routers and moving the duties to the ingress and/or egress switches, the processing demands on the router processor are significantly reduced. As the processing demands are significantly reduced, this allows increased size for the network as a whole as the router processor can do increased numbers of other router tasks.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:

1. A switch comprising:
a processor;
random access memory coupled to said processor;
program storage coupled to said processor; and
at least two ports coupled to said processor, at least one port for connecting to a node device and at least one port for connecting to a network device,
wherein said program storage includes a program which, when executed by said processor, causes said processor to perform the following method steps of:
determining if a received extended link services (ELS) request (REQ) packet contains at least one device address in the packet payload;
determining if said received ELS REQ packet has a header source address indicating said received ELS REQ packet is from a translation domain of a router; and
changing any device addresses in the packet payload if said received ELS REQ packet contains at least one device address in the packet payload and if said received ELS REQ packet has a header source address indicating said received ELS REQ packet is from a translation domain,
wherein said determining steps and said changing step are performed if the switch is operating as an egress switch for said received ELS REQ packet.

2. The switch of claim 1, wherein said step of changing any device addresses in the packet payload includes copying relevant device addresses in the packet header into the packet payload to replace the device addresses in the packet payload.

3. The switch of claim 1, further comprising:
packet trapping hardware coupled to said processor and to said at least two ports to trap packets received at a port and provide said trapped packets to said processor;
the method further comprising the steps of:
determining if said received ELS REQ packet has a header destination address indicating said received ELS REQ packet is to a translation domain of the router;
determining if an ELS response (RSP) packet related to said received ELS REQ packet will contain at least one device address in the packet payload;
setting a trap for a received ELS RSP packet related to said received ELS REQ packet if said received ELS REQ packet has a header destination address indicating said received ELS REQ packet is to a translation domain and if an ELS RSP packet related to said received ELS REQ packet will contain at least one device address in the packet payload; and
changing any device addresses in the packet payload of a trapped received ELS RSP packet,
wherein said additional determining steps of this claim and said setting step are performed if the switch is operating as an ingress switch for said received ELS REQ packet, and wherein said changing device addresses in said trapped received ELS RSP packet step is performed if the switch is operating as an egress switch for said trapped received ELS RSP packet.

4. A network comprising:
a first fabric including:
a first switch including:
a first processor;
first program storage coupled to said first processor;
at least two ports coupled to said first processor, at least one port for connecting to a node device and at least one port for coupling to a network device; and
a first packet switch coupled to said at least two ports to perform packet switching between said at least two ports,
wherein said first switch provides an extended link services (ELS) request (REQ) packet received at said at least one port for connecting to a node device to said at least one port for coupling to a network device;
a second fabric including:
a second switch including:
a second processor;
second program storage coupled to said second processor;
at least two ports coupled to said second processor, at least one port for connecting to a node device and at least one port for coupling to a network device; and
a second packet switch coupled to said at least two ports to perform packet switching between said at least two ports; and
a router coupled between said first switch and said second switch, said router acting as the network device for said first switch and said second switch, said router including:
a router processor;
at least two ports coupled to said router processor, at least one port for coupling to said first switch and at least one port for coupling to said second switch; and
a router packet switch and processor coupled to said at least two ports to perform packet switching between said at least two ports, said router packet switch and processor converting device addresses in the header of said ELS REQ packet provided from said first switch and not converting any device addresses in the payload of said ELS REQ packet and providing said ELS REQ packet with converted header addresses to said at least one port for coupling to said second switch,
wherein said second program storage includes a program which, when executed by said second processor, causes said second processor to perform the following second method step of:

wherein said step of converting any device addresses in the ELS REQ packet payload includes:
determining if said ELS REQ packet with converted header addresses contains at least one device address in the packet payload;
determining if said ELS REQ packet with converted header addresses has a header source address indicating said received ELS REQ packet is from a translation domain of the router; and
changing any device addresses in the packet payload if said ELS REQ packet with converted header addresses contains at least one device address in the packet payload and if said ELS REQ packet with converted header addresses has a header source address indicating said ELS REQ packet with converted header addresses is from a translation domain, and
wherein said second switch provides said fully converted ELS REQ packet to said at least one port for connecting to a node device.

5. The network of claim 4, wherein said step of converting any device addresses in the packet payload includes copying relevant device addresses in the packet header into the packet payload to replace the device addresses in the packet payload.

6. The network of claim 4, further comprising:
wherein said second switch provides an ELS response (RSP) packet received at said at least one port for connecting to a node device to said at least one port for coupling to a network device,
wherein said router packet switch and processor converts device addresses in the header of said ELS RSP packet and does not convert any device addresses in the payload of said ELS RSP packet and provides said ELS RSP packet with converted header addresses to said at least one port for coupling to said first switch,
wherein said first program storage includes a program which, when executed by said first processor, causes said first processor to perform the following first method step of:
converting any device addresses in the payload of said ELS RSP packet with converted header addresses to be a fully converted ELS RSP packet, and
wherein said first switch provides said fully converted ELS RSP packet to said at least one port for connecting to a node device.

7. The method of claim 6, said first method further comprising the steps of:
determining if said received ELS REQ packet has a header destination address indicating said received ELS REQ packet is to a translation domain of the router;
determining if an ELS RSP packet related to said received ELS REQ packet will contain at least one device address in the packet payload; and
setting a trap in said first packet switch for a received ELS RSP packet related to said received ELS REQ packet if said received ELS REQ packet has a header destination address indicating said received ELS REQ packet is to a translation domain and if an ELS RSP packet related to said received ELS REQ packet will contain at least one device address in the packet payload,
wherein said first packet traps said ELS RSP packet with converted header addresses for handling based on said step of setting a trap.

8. A method of operating a switch comprising the steps of:
receiving an extended link services (ELS) request (REQ) packet at a port; determining if said received ELS REQ packet contains at least one device address in the packet payload;
determining if said received ELS REQ packet has a header source address indicating said received ELS REQ packet is from a translation domain; and
changing any device addresses in the packet payload if said received ELS REQ packet contains at least one device address in the packet payload and if said received ELS REQ packet has a header source address indicating said received ELS REQ packet is from a translation domain of a router,
wherein said determining steps and said changing step are performed if the switch is operating as an egress switch for said received ELS REQ packet.

9. The method of claim 8, wherein said step of changing any device addresses in the packet payload includes copying relevant device addresses in the packet header into the packet payload to replace the device addresses in the packet payload.

10. The method of claim 8, further comprising the steps of: determining if said received ELS REQ packet has a header destination address indicating said received ELS REQ packet is to a translation domain;
determining if an ELS response (RSP) packet related to said received ELS REQ packet will contain at least one device address in the packet payload;
setting a trap for a received ELS RSP packet related to said received ELS REQ packet if said received ELS REQ packet has a header destination address indicating said received ELS REQ packet is to a translation domain of the router and if an ELS RSP packet related to said received ELS REQ packet will contain at least one device address in the packet payload;
receiving an ELS RSP packet at a port;
trapping said received ELS RSP packet for handling based on said step of setting a trap; and changing any device addresses in the packet payload of said trapped received ELS RSP packet,
wherein said additional determining steps of this claim and said setting step are performed if the switch is operating as an ingress switch for said received ELS REQ packet, and
wherein said trapping step and said changing device addresses in said trapped received ELS RSP packet step are performed if the switch is operating as an egress switch for said received ELS RSP packet.

11. A method of operating a network comprising the steps of:
receiving an extended link services (ELS) request (REQ) packet at a port of a first switch in a first fabric;
providing said ELS REQ packet from a port of said first switch to a port of a router;
converting, by said router, device addresses in the header of said ELS REQ packet and not converting any device addresses in the payload of said ELS REQ packet;
providing said ELS REQ packet with converted header addresses from a port of said router to a port of a second switch in a second fabric; and
converting, by said second switch, any device addresses in the payload of said ELS REQ packet with converted header addresses to be a fully converted ELS REQ packet and providing the fully converted ELS REQ packet,
wherein said step of converting any device addresses in the ELS REQ packet payload includes: determining if said received ELS REQ packet contains at least one device address in the packet payload;

determining if said received ELS REQ packet has a header source address indicating said received ELS REQ packet is from a translation domain of the router; and changing any device addresses in the packet payload if said received ELS REQ packet contains at least one device address in the packet payload and if said received ELS REQ packet has a header source address indicating said received ELS REQ packet is from a translation domain.

12. The method of claim 11, wherein said step of converting any device addresses in the packet payload includes copying relevant device addresses in the packet header into the packet payload to replace the device addresses in the packet payload.

13. The method of claim 11, further comprising the steps of:

receiving an ELS response (RSP) packet at a port of said second switch;

providing said ELS RSP packet from a port of said second switch to a port of a router;

converting, by said router, device addresses in the header of said ELS RSP packet and not converting any device addresses in the payload of said ELS RSP packet;

providing said ELS RSP packet with converted header addresses from a port of said router to a port of said first switch; and converting, by said first switch, any device addresses in the payload of said ELS RSP packet with converted header addresses to be a fully converted ELS RSP packet and providing the fully converted ELS RSP packet.

14. The method of claim 13, further comprising the steps of:

determining, by said first switch, if said received ELS REQ packet has a header destination address indicating said received ELS REQ packet is to a translation domain of the router;

determining, by said first switch, if an ELS RSP packet related to said received ELS REQ packet will contain at least one device address in the packet payload;

setting, by said first switch, a trap for a received ELS RSP packet related to said received ELS REQ packet if said received ELS REQ packet has a header destination address indicating said received ELS REQ packet is to a translation domain and if an ELS RSP packet related to said received ELS REQ packet will contain at least one device address in the packet payload; and trapping, by said first switch, said ELS RSP packet with converted header addresses for handling based on said step of setting a trap.

\* \* \* \* \*